United States Patent Office 3,652,487
Patented Mar. 28, 1972

3,652,487
PROCESS FOR THE POLYMERIZATION OF ALICYCLIC MONOMER MASTERBATCHES
John P. Ward, Cuyahoga Falls, and William A. Judy, Akron, Ohio, assignors to The Goodyear Tire & Rubber Company, Akron, Ohio
No Drawing. Filed Feb. 5, 1970, Ser. No. 9,056
Int. Cl. B01j 11/06; C08f 45/02, 45/28
U.S. Cl. 260—33.6 AQ
8 Claims

ABSTRACT OF THE DISCLOSURE

There is disclosed a process for the polymerization of a monomeric premix comprised of monomer, filler, antioxidant, extending oil and crosslinking agent, by subjecting said monomeric premix under polymerization conditions to a four component catalyst system comprised of an organoaluminum compound, molecular oxygen, a tungsten metal salt and at least one compound of the general formula R—Y—H, wherein Y is selected from the group consisting of oxygen and sulfur and R is selected from a group consisting of hydrogen and hydrocarbon radicals and the products obtained by such a process.

The present invention relates to a novel process for the production of molded rubber products through the polymerization of unsaturated alicyclic hydrocarbons. Most particularly, the invention relates to a one-step process for the production of molded rubber products by polymerizing unsaturated alicyclic hydrocarbons in the presence of fillers, oil extenders, crosslinking agents and antioxidants.

The process of this invention is capable of being employed for the production of moldable and castable articles such as plastic materials, rubber-like goods, shoe soles, heels, industrial belts and vehicle tires in a one-step process wherein a polymerization premix containing monomer, filler, oil extender, crosslinking agent and antioxidant is introduced into a mold, exposed to catalyst, and a finished product obtained. The economic advantages of a one-step system of this type are readily apparent.

Several problems are inherent in such a system. One is the formation of blisters resulting in a weakening of the finished product due to the use of highly volatile materials as catalysts solvents. Another is the adverse effect upon the catalyst activity of impurities inherent in certain of the components which make up the polymerization system.

It is one of the objects of this invention to provide a one-step process for the production of moldable and castable articles. It is another object of this invention to provide for the production of strong, blister-free molded and cast articles. Still another object of this invention is to provide materials of low volatility as catalyst carriers and which do not adversely affect catalyst activity. It is yet another object of this invention to provide a method of catalyst addition which effectively purges the polymerization premix of inherent impurities. Other objects will become apparent as the description proceeds.

This invention comprises polymerizing a preformed mixture comprising (I) at least one unsaturated alicyclic hydrocarbon selected from the group consisting of unsaturated alicyclic hydrocarbons containing at least 4 and not more than 5 carbon atoms in the cyclic ring and containing one carbon-to-carbon double bond in the cyclic ring and unsaturated alicyclic hydrocarbons containing at least 7 carbon atoms in the cyclic ring and containing at least one carbon-to-carbon double bond in the cyclic ring, (II) at least one compound selected from a group consisting of reinforcing agents, inert fillers and mineral pigments, (III) at least one antioxidant selected from a group consisting of highly hindered substituted phenols and aromatic amines, (IV) at least one extending oil selected from a group consisting of naphthenic paraffinic and aromatic oils and (V) at least one polyfunctional crosslinking agent, by subjecting said preformed mixture under polymerization conditions, to a catalyst system comprising (A) an organoaluminum compound, (B) molecular oxygen, (C) at least one transition metal salt selected from the group consisting of tungsten halides and tungsten oxyhalides and (D) at least one compound of the general formula R—Y—H wherein Y is selected from the group of oxygen and sulfur and R is a radical selected from the group consisting of (1) hydrogen, (2) alkyl, (3) aryl, (4) arylalkyl, (5) alkaryl, (6) alkenyl, (7) when Y is sulfur, R is selected from the group consisting of thioalkyl, thioarylalkyl and thioalkaryl, (8) when Y is oxygen R is selected from the group consisting of alkoxy, aryloxy and alkaryloxy and (9) radicals of (2) through (6) wherein at least one hydrogen is substituted by a material selected from the group consisting of thiol (SH) and hydroxy (OH) groups and wherein the catalyst components are partially preformed in hydrocarbon solvents having low volatilities.

Various unsaturated alicyclic compounds may be polymerized in the practice of this invention. Unsaturated alicyclic compounds useful in accordance with this invention are selected from the group consisting of: (I) alicyclic compounds corresponding to the formula:

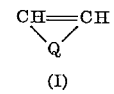

(I)

wherein:

(1) Q is a fragment which comprises a sequence of at least 5 carbon atoms situated in linear succession between the methylidene carbons which constitute the double bond;

(2) The carbon atoms in the linear succession of Q may be interconnected by both carbon-carbon single bonds and carbon-carbon double bonds;

(3) Any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;

(4) Any of said carbon atoms in the linear succession of Q may be constituents of aromatic rings and alicyclic rings; and (5) Said alicyclic unsaturated hydrocarbon contains no nonaromatic conjugated double bonds; and (II) Alicyclic compounds corresponding to the formula:

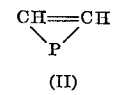

(II)

wherein:

(1) P is a fragment which comprises a sequence of at least 2 and not more than 3 carbon atoms situated in linear sucession between the methylidene carbons which constitute the double bond;

(2) The carbon atoms in linear succession of P are connected by carbon-to-carbon single bonds;

(3) Any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;

(4) Any of said carbons in linear succession of P may be constituents of aromatic rings and alicyclic rings, and (5) Said alicyclic unsaturated hydrocarbon compound contains no nonaromatic conjugated double bonds.

The unsaturated hydrocarbon compounds useful in accordance with the teachings of the present invention and as defined by the Formulas I and II set forth above include both mono- and polycyclic unsaturated hydrocarbon compounds. Representative examples of polycyclic unsaturated hydrocarbon compounds within the scope of this invention include 2,2,2-bicyclooctene-2, norbornene, norbornadiene and the like.

The preferred unsaturated alicyclic compounds of this invention are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of unsaturated alicyclic compounds containing at least seven carbon atoms in the cyclic ring and containing 1 or more nonconjugated carbon-to-carbon double bonds in the cyclic ring include cyclooctene; 1,4- and 1,5-cyclooctadiene; 1,4,7-cyclononatriene; 1,4-, 1,5- and 1,6-cyclodecadiene; 1,4-, 1,5-, 1,6- and 1,7-cyclododecadiene; 1,4,7- and 1,5,9-cyclododecatriene and the like.

The most preferred unsaturated alicyclic compounds of this invention are those containing from one to three carbon-to-carbon double bonds in the ring and in which the double bonds are located in relation to each other in a manner that they are not adjacent and are nonconjugated. Representative examples of such preferred materials are cyclobutene, cyclopentene, cyclooctene, cyclododecene, and 1,5-cyclooctadiene, 1,5,9-cyclododecatriene and 1,9,17-cyclotetracosatriene.

Various other unsaturated alicyclic hydrocarbons may be employed in the practice of this invention such as substituted unsaturated alicyclic compounds which include alkyl, aryl, aralkyl, alkaryl and halogen-substituted compounds.

Representative examples of substituted alicyclic compounds are alkyl-substituted compounds such as 1-methyl-1,5-cyclooctadiene; aryl-substituted compounds such as 3-phenyl-1-cyclooctene; aralkyl-substituted compounds such as 3-benzyl-1-cyclooctene; alkaryl-substituted compounds such as 3-tolyl-1-cyclooctene and halogen-substituted compounds such as 1-chloro-1,5-cyclooctadiene; 1-bromo-1,5-cyclooctadiene and the like. Mixtures of these unsaturated alicyclic compounds may be polymerized including both substituted, unsaturated alicyclic compounds and the unsubstituted, unsaturated alicyclic compounds.

The second component employed in the polymerization mixture are various well-known reinforcing agents, inert fillers and mineral pigments ordinarily blended with polymeric materials. Such reinforcing agents, inert fillers and mineral pigments are employed to increase hardness, stiffness, strength and resistance to tear and abrasion, to reduce compound costs and to impart various colors to the finished product. Representative examples of these materials are commercially available carbon blacks such as fast extruding furnace blacks (FEF), intermediate super abrasion furnace blacks (ISAF), high abrasion furnace black (HAF) and the like; titanium dioxide, iron oxide and the like. It will be obvious to those skilled in the art that there is a variety of other fillers, pigments and reinforcing agents capable of being incorporated within the scope of this invention. The only limiting requirement which must be made as to additional additive materials of this nature is that they be completely anhydrous.

The third embodiment employed in the polymerization mixture are various antioxidants. Generally, the antioxidants employed in the practice of this invention fall into two categories (1) alkylphenols and (2) aromatic amines. These antioxidants must be highly hindered so that the radical produced from the amino or phenolic compound is not, reactive toward the polymer produced or catalyst system employed. Representative examples of these highly hindered alkyl phenols and aromatic amines include 2,6-di-tert-butyl-4-methylphenol, 2,6-di-tert-butyl-4-ethylphenol, 2,4,6 - tri - tert - butylphenol, 2-tert-butyl-4-methyl-6-ethylphenol, ortho- and para-ditolylamine, phenyl-alpha-naphthylamine, phenyl-beta-naphthylamine, sym-di-beta-naphthyl-paraphenylene diamine and the like.

The extending oils useful as the fourth component in the polymerization premix of the present invention are oils selected from a group consisting of (1) highly saturated nonpolar naphthenic hydrocarbons which comprise predominately the high resinous portions of high boiling petroleum distillates, (2) aromatic hydrocarbon oils and (3) paraffinic hydrocarbon oils. The naphthenic oils can be characterized by their high saturates content (60 to 95 percent by weight, their low polar compound content (0.2 to 1.5 percent by weight), Saybolt viscosities at 212° F. ranging from about 40.0 to about 60.0 and specific gravities at 60° F. ranging from about 0.878 to about 0.919. Representative but not inclusive examples of the above described commercially available naphthenic oils include among others those marketed by the Shell Oil Company under the trade name Shellflex and those marketed by the Humble Oil and Refining Company under the trade name Flexon. By the term "aromatic" hydrocarbon oils is meant oils which contain 30 to 60 percent of the carbon atoms in aromatic rings and wherein the viscosity gravity constant (VGC), which is a function of the composition of the oil and increases as the number of aromatic or naphthenic rings increases, ranges from about 0.9 to about 1.1. By the term "paraffinic" hydrocarbon oils is meant oils containing from about 50 to about 70 percent of the carbon atoms in paraffinic chains and having a viscosity gravity constant ranging from about 0.79 to about 0.86. Representative but not inclusive examples of these aromatic and paraffinic hydrocarbons include those, among others, commercially available from the Humble Oil and Refining Company and marketed under the trade names "Flexon" and "Primol." These oils are generally employed in a ratio of parts per hundred monomer (phm.) ranging from about 5 phm. to about 100 phm.

The fifth component employed in the polymerization mixture is a compound capable of functioning as a cross-linking agent. The crosslinking agents employed in the practice of this invention consist of dimers produced from unsaturated alicylic hydrocarbons. These dimers are composed of two or more alicyclic rings, each ring containing at least one or more nonconjugated double bonds, capable of reacting with the double bonds in the polymer chain when used in the presence of a transalkylidenation catalyst such as is employed in this invention. Representative examples of such crosslinking agents include tricyclo [8.2.1.0$^{2,9}$] trideca-5,11-diene, 5,5'-dicyclooctenyl; 3,3'-dicyclooctenyl and the like. The most preferred polyfunctional crosslinking agent is tricyclo [8.2.1.0$^{2,9}$] trideca-5, 11-diene.

The catalyst systems employed in the polymerizations of this invention are a combination comprising: (A) at least one organoaluminum compound, (B) molecular oxygen, (C) at least one transition metal salt selected from the group consisting of tungsten halides and tungsten oxyhalides, and (D) at least one compound of the general formula R—Y—H where Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a group selected from hydroxy (OH) and thiol (SH). The Periodic Table of Elements referred to may be found in the Handbook of Chemistry and Physics, 44th edition, April 1962 reprint, published by the Chemical Rubber Publication Company, Cleveland, Ohio, U.S.A., page 448.

Representative examples of the organoaluminum compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum, and the like; triarylaluminums such as tritolylaluminum, tribenzylaluminum, triphenylaluminum, and the like; dialkylaluminum halides such as diethylaluminum chloride, di-n-propylaluminum chloride, diisobutylaluminum chloride, diethylaluminum bromide, diethylaluminum iodide and diethylaluminum fluoride, and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride, and the like; arylaluminum hydrides and dihydrides such as diphenylaluminum hydride and phenylaluminum dihydride, the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide, and the like. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminum sesquihalides.

Representative examples of the transition metal salt, useful as the third or (C) catalyst component of this invention and selected from a group consisting of tungsten halides and oxyhalides, include tungsten dibromide, tungsten pentabromide, tungsten hexabromide, tungsten dichloride, tungsten tetrachloride, tungsten pentachloride, tungsten hexachloride, tungsten hexafluoride, tungsten diiodide, tungsten tetraiodide, tungsten oxytetrabromide, tungsten oxytetrachloride and tungsten oxytetrafluoride. The most preferred tungsten halides and oxyhalides are tungsten hexachloride, tungsten hexafluoride, tungsten oxytetrachloride and tungsten oxytetrafluoride.

The fourth or (D) catalyst component of this invention are compounds which respond to the formula R—Y—H wherein Y is selected from a group consisting of oxygen and sulfur and R is a radical selected from the group consisting of (1) hydrogen, (2) alkyl, (3) aryl, (4) arylalkyl, (5) alkaryl, (6) alkenyl, (7) when Y is sulfur, R is thioalkyl, thioarylalkyl and thioalkaryl, (8) when Y is oxygen, R is alkoxy, arylalkoxy and alkaryloxy and (9) radicals of (2) through (6) wherein at least one hydrogen of R is substituted by at least one thiol (SH) or hydroxyl (OH) group.

Thus, the formula set forth above for the (D) catalyst component defines a number of types of compounds such as water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxymercaptans (HSROH) or thioalcohols (HORSH). Representative examples of the materials corresponding to the formula above are alcohols representative of which are methanol, ethanol, isopropanol, amyl alcohol, benzyl alcohol, phenol allyl alcohol and the like; mercaptans such as methyl, ethyl, propyl, isopropyl, butyl, amyl and similar mercaptans, allyl mercaptan, thiophenol, 4-methyl-thiophenol and the like; hydroperoxides such as cumylperoxide, tetriarylbutyl hydroperoxide and the like; hydrodisulfides such as cumyl hydrodisulfide, tertiarylbutyl hydrodisulfide and the like; polyalcohols such as ethylene glycol, glycerol, and similar polyglycols; catechol, resorcinol, hydroquinone, pyrogallol and the like; polymercaptans such as 1,3-propane dithiol, 1,4-dithiobenzene and the like and hydroxymercaptans or thioalcohols such as ethan-2-ol-1-thiol, 1-hydroxy-4-thiobenzene and the like. The most preferred compounds of those listed above are saturated and unsaturated alcohols.

The polymerization premixes of the present invention are prepared by combining the individual components, that is, monomer, heat treated reinforcing agents, fillers and mineral pigments, extending oil and antioxidant and ballmilling for a sufficient length of time in order to obtain a finely dispersed solution. The amount of the individual components which go to make up the polymerization premixes can vary appreciably, depending upon the product sought and the desired properties thereof. Thus, no definitive polymerization premix composition can be set forth but can be readily determined by one skilled in the art. However, for illustrative purposes such a polymerization premix could be composed of 100 parts of monomer, 25 phm. of a saturated nonpolar naphthenic oil, 1 phm. antioxidant and 15 phm. of an inert filler or reinforcing agent.

The catalysts employed in this invention are prepared by mixing the components by known techniques. Thus, the catalyst may be prepared by "preformed" or "in situ" techniques. However, the preferred method of mixing the individual catalyst components is to partially preform specific components in specific solvents. Thus, an excellent active catalyst can be prepared by separately preforming first the (C) catalyst component with a sufficient quantity of the (D) catalyst component to give an oxygen to tungsten (O/W) molar ratio of 1.0/1.0.

The (A) catalyst component is combined with sufficient (B) catalyst component to give an oxygen to aluminum (O/Al) molar ratio ranging from about 0.15/1.0 to about 1.0/1.0. The active catalyst species is then generated from the two preformed catalyst solutions by combining them in situ in the polymerization premix. The catalyst components are preferably combined as suspensions or solutions in either aromatic or paraffinic oils such as described above. The use of aromatic or paraffinic oils as catalyst carriers is largely dictated by necessity. When hydrocarbon solvents ordinarily useful as catalyst carriers are employed, blistering and weakening of the finished product occurs during the simultaneous polymerization and molding step even though the total amount of catalyst solvent employed is small. Thus, to eliminate this problem, it is necessary to employ solvents of low volatility, but which still have the capacity of solubilizing the individual catalyst components without having an adverse effect on the active catalyst species. The aromatic and paraffinic oils described above meet these requirements.

Successful results can also be obtained when the (A) catalyst component is not preformed with the (B) catalyst component, but this is only true when low levels (about 10 phm. or less) of filler or reinforcing agent are employed. Thus, at higher levels of filler or reinforcing agent, i.e. 10 phm. and higher, the (B) component modification of the (A) catalyst component is necessary.

The preferred mode of addition of the catalyst system to the polymerization premix is usually to inject a catalytic amount of the preformed solution containing the (A) and (B) catalyst components followed by the immediate addition of the preformed solution containing the (C) and (D) catalyst components. This mode of adding the two preformed catalytic solutions allows for the purging of the polymerization premix of any inherent impurities present in the filler or reinforcing agent employed. However, in the monomer premixes containing low levels of mineral filler and reinforcing agent and wherein inherent impurities are not as prevalent, addition of the two preformed catalyst solutions can be reversed with good results.

The amount of catalyst employed in the process of this invention may be varied over a wide range of concentrations and has not been found to be critical. The optimum amount of catalyst employed depends on a number of factors such as temperature, reactants used, purity of reactants, reaction times desired and the like. Those skilled in the art will be readily able to determine the optimum catalytic ranges.

It has been found that good results are obtainable in the practice of this invention when the molar relationship between the four catalyst components (A), (B), (C) and (D) as previously defined are as follows: the molar ratio of (D)/(C) ranges from about 0.3/1 to about 20/1, the molar ratio of (B)/(A) ranges from about 0.15/1 to about 1/1 and the molar ratio of (A)/(C) ranges from about 3/1 to at least 30/1. The most preferred ratios are molar ratios of (D)/(C) ranging from about 1/1 to about 2/1; molar ratios of (B)/(A) ranging from about 0.3/1 to about 0.5/1 and molar ratios of (A)/(C) ranging from about 3/1 to about 10/1.

Temperatures at which the process of this invention may be carried out can be varied over a wide range. Usually the temperature may be varied from $-10°$ to $150°$ C. It is generally preferred, however, to conduct the process at a temperature in the range from about $25°$ C. to about $50°$ C.

It is thought that the polymerizations of this invention take place through a "ring-opening" polymerization mechanism. Such ring-opening polymerizations of unsaturated alicyclic hydrocarbons can be used to make a number of perfectly alternating copolymers and terpolymers that have not been capable of being made before. For example, in the process of this invention, the ring-opening polymerization of cyclooctene yields a product composed of polyoctenamer which may be considered the alternating copolymer of one butadiene unit and two ethylene units.

Similarly, the ring-opening polymerization of cyclooctadiene-1,5 leads to a polybutenamer which is equivalent to the 1,4-addition polymer of butadiene-1,3. In practicing this invention, polybutenamers may be formed whose structure comprises alternating cis- and trans-vinylene groups in successive polymeric repeat units which is equivalent to the polymer which may be obtained by the 1,4-addition polymerization of butadiene-1,3 in which successive butadiene-1,3 units alternately occur in the cis- and trans-configurations. Such a polymer could be considered an alternating copolymer of cis- and trans-1,4 poly(butadiene-1,3).

The employment of substituted alicyclic hydrocarbons in the process of this invention would also lead to finished products composed of interesting polymers. For example, the ring-opening polymerization of 5-methylcyclooctene-1 would yield the alternating terpolymer of butadiene-1,3, propylene and ethylene; likewise, 5-phenylcyclooctene-1 would yield the alternating terpolymer of butadiene-1,3, styrene and ethylene. The ring-opening polymerization of 5-methylcyclooctadiene-1,5 would yield the alternating copolymer of butadiene-1,3 and isoprene. The ring opening polymerization of substituted cyclododecenes can yield even more complicated alternating copolymers, terpolymers and even quadripolymers.

The process of the present invention is employed in conjunction with any of the well-known methods for molding and casting articles from thermosetting plastic materials and/or curable polymeric compositions. Such well-known and widely applied methods include extrusion, rotational casting, die casting, injection molding, open mold casting and the like.

As illustrative of the application of the process of the present invention to the above molding and casting techniques, a preformed mixture containing monomer, filler, antioxidant, extending oil and crosslinking agent is added to a 4-ounce glass reaction bottle. To this mixture is added sufficient catalyst to effectuate the polymerization of the mixture. The bottle is then placed on rollers to distribute the polymerizing mixture over the entire inner surface of the bottle. When the polymerization is complete the glass reaction bottle is broken away from the polymerized mixture leaving a hollow rubber article having the same shape as the reaction bottle.

As a further illustration of the applicability of the present invention to well-known molding and casting techniques, a predetermined amount of a preformed mixture containing monomer, filler, antioxidant, extending oil and crosslinking agent is added to a mixing chamber. To this mixture is added sufficient catalyst to effectuate polymerization. The polymerizing mixture is then poured into an open shoe sole mold while it is still in a pourable state. After sufficient reaction time a solid rubber sole is obtained.

The following examples are set forth to further illustrate the nature of this invention. However, it should be understood that the examples are set forth for illustrative and not for limitative purposes.

EXAMPLE I

A series of polymerizations was carried out employing a premix consisting of 25.5 grams (gms.) of cyclooctene, 9.7 milliliters (ml.) of Shellflex 310 (SF–310), a naphthenic oil having a specific gravity of 0.878, a saturates content of 79.6% and a Saybolt viscosity at $212°$ F. of 49.3, and 0.36 gm. of ditertiary-butyl-p-cresol. All manipulations of preparing the premix and the charging of the catalyst components were conducted under a nitrogen atmosphere. A four-component catalyst system comprised of tungsten hexachloride ($WCl_6$), ethyl alcohol (EtOH), ethylaluminum dichloride (EADC) and molecular oxygen ($O_2$) was employed. The $WCl_6$ and EtOH components were preformed in a mole ratio of 1/1 to give a 0.05 molar (M) solution in Flexon 340, an aromatic oil having 31% of the carbon atoms in aromatic rings and a viscosity gravity constant (VGC) of 0.942. The $O_2$ and EADC components were preformed in a mole ratio of $O_2$ to EADC to 0.33/1 to give a 0.2 M solution in SF–310. All experiments were run for a period of two hours at ambient temperatures. All pertinent data are listed in Table I below:

TABLE I

| Experiment number | $WCl_6$/EtOH moles×$10^4$ | EADC/$O_2$ moles×$10^4$ | Wt. percent yield | DSV |
|---|---|---|---|---|
| 1 | 0.5 | 2.4 | 91.5 | 2.2 |
| 2 | 0.5 | 2.8 | 95.5 | 2.4 |
| 3 | 0.5 | 3.2 | 93.1 | 2.3 |
| 4 | 0.5 | 3.6 | 44.7 | |
| 5 | 1.0 | 2.8 | 92.4 | 1.6 |
| 6 | 1.0 | 3.2 | 95.4 | 1.9 |
| 7 | 1.0 | 3.6 | 95.5 | 2.3 |
| 8 | 1.0 | 4.0 | 78.8 | |
| 9 | 1.0 | 4.4 | 86.5 | |

EXAMPLE II

A series of experiments similar to Example I was carried out except that a 0.5 M preformed solution of oxygen ($O_2$) and ethylaluminum dichloride (EADC) in Primol 355, a paraffinic oil having a viscosity gravity constant (VGC) of 0.86 was employed in place of the 0.2 M preformed solution of $O_2$ and EADC in SF–310 employed in Example I. The $O_2$ to EADC mole ratio of this preformed solution was 0.33/1. All polymerizations were allowed to run for 30 minutes. Pertinent data are listed in Table II below:

TABLE II

| Experiment Number | WCl$_6$/EtOH moles×10$^4$ | EADC/O$_2$ moles×10$^4$ | Wt. percent yield |
|---|---|---|---|
| 1 | 0.25 | 2.50 | 77.0 |
| 2 | 0.50 | 2.50 | 94.3 |
| 3 | 0.50 | 5.00 | 56.8 |
| 4 | 0.50 | 1.25 | 99.4 |
| 5 | 0.50 | 1.75 | 94.3 |
| 6 | 0.50 | 1.00 | 52.2 |
| 7 | 0.50 | 1.50 | 98.8 |
| 8 | 0.50 | 1.25 | 100.0 |
| 9 | 0.50 | 1.50 | 100.0 |
| 10 | 0.50 | 1.75 | 80.6 |
| 11 | 0.50 | 1.50 | 100.0 |

EXAMPLE III

A series of experiments was carried out in a premix containing 700 ml. of freshly distilled cyclooctene, 149.0 gms. of SF-310, 6.0 gms. of ditertiarybutyl-p-cresol and 357.0 gms. (60 phm.) of heat treated iron oxide. A 0.05 M preformed solution of WCl$_6$ and EtOH in Flexon 340 was prepared wherein the mole ratio of EtOH to WCl$_6$ was 1/1. A 0.5 M preformed solution of O$_2$ and EADC in SF-310 was prepared wherein the mole ratio of O$_2$ to EADC was 0.33/1. After the premix was ballmilled for 16 hours, 40 ml. aliquots were added to each of 6 4-ounce reaction bottles. All manipulations of charging premix and catalyst were carried out under a nitrogen atmosphere. The two preformed solutions were added to the polymerizable mixture by the in situ method of addition. All pertinent data are listed in Table III below. All reactions were carried out at ambient temperature for one hour employing 1×10$^{-4}$ moles of the 0.05 M WCl$_6$/EtOH solution throughout. All products obtained were solid rubbery compositions.

TABLE III

| Experiment Number | EADC/O$_2$ moles×10$^4$ | Wt. percent yield |
|---|---|---|
| 1 | 20.0 | 96.7 |
| 2 | 22.0 | 95.1 |
| 3 | 18.0 | 86.7 |
| 4 | 19.0 | 96.4 |
| 5 | 26.0 | 95.2 |
| 6 | 20.0 | 94.6 |

EXAMPLE IV

A series of polymerizations was carried out on a premix containing 700 ml. of freshly distilled cycloctene, 149 gm. of SF-310, 6.0 gm. of ditertiarybutyl-p-cresol and 29.7 gm. (5 phm.) of intermediate super abrasion furnace black (ISAF). A 0.05 M preformed solution of WCl$_6$ and EtOH in Flexon 340 was prepared to give an EtOH/WCl$_6$ molar ratio of 1.0/1.0. A 0.5 M preformed solution of EADC and O$_2$ was prepared in SF-310 to give an O/Al molar ratio of 0.3/1.0. After the premix was ballmilled for 16 hours, 40 ml. aliquots were transferred to each of 11 4-ounce reaction bottles. All manipulations of charging premix and catalyst were carried out under a nitrogen atmosphere. All pertinent data are included in the Table IV below. Reaction times were 3 hours for all runs.

TABLE IV

| Experiment Number | WCl$_6$/EtOH moles×10$^4$ | EADC/O$_2$ moles×10$^4$ | Percent yield |
|---|---|---|---|
| 1 | 1.25 | 5 | 83.5 |
| 2 | 1.25 | 6 | 97.9 |
| 3 | 1.25 | 7 | 98.8 |
| 4 | 1.25 | 8 | 96.2 |
| 5 | 1.25 | 9 | 83.9 |
| 6 | 1.25 | 5 | 89.7 |
| 7 | 1.25 | 6 | 96.0 |
| 8 | 1.25 | 8 | 83.4 |
| 9 | 1.25 | 9 | 64.5 |
| 10 | 1.50 | 7 | 96.9 |
| 11 | 1.50 | 7 | 97.1 |

EXAMPLE V

A series of polymerizations was carried out similar to Example IV except that the amount of ISAF carbon black was increased from 5 phm. to 10 phm. All pertinent data are listed in Table V below. All polymerizations were allowed to react for 20 hours at ambient temperature.

TABLE V

| Experiment Number | WCl$_6$/EtOH moles×10$^4$ | EADC/O$_2$ moles×10$^4$ | Wt. percent yield |
|---|---|---|---|
| 1 | 1.5 | 7.0 | 98.6 |
| 2 | 1.5 | 8.5 | 89.4 |
| 3 | 1.5 | 10.0 | 88.0 |
| 4 | 1.5 | 8.0 | 90.2 |
| 5 | 1.5 | 7.5 | 84.8 |
| 6 | 2.0 | 8.0 | 88.7 |
| 7 | 1.5 | 8.0 | 82.1 |
| 8 | 1.0 | 8.0 | 77.5 |

EXAMPLE VI

A series of experiments was carried out on a premix containing 700 ml. of freshly distilled cyclooctene, 149 gms. of SF-310 (25 phm.), 6.0 gms. of ditertiarybutyl-p-cresol and 60.0 gms. (10 phm.) of fast extruding furnace black (FEF). A 0.05 M preformed solution of WCl$_6$ and EtOH in Flexon 340 was prepared to give an EtOH to WCl$_6$ mole ratio of 1.0/1.0. A 0.5 M preformed solution of EADC and O$_2$ was prepared in Primol 355 to give an O/Al molar ratio of 0.3/1.0. After the premix was ballmilled for 16 hours 40 ml. aliquots of this premix were added to each of seven 4-ounce reaction bottles. All manipulations of charging premix and catalyst were carried out under a nitrogen atmosphere. Polymerization time was 20 hours for all reactions. All pertinent data are listed in Table VI below.

TABLE VI

| Experiment No. | WCl$_6$/EtOH moles×10$^4$ | EADC/O$_2$ moles×10$^4$ | Wt. percent yield |
|---|---|---|---|
| 1 | 1.0 | 7.5 | 88.8 |
| 2 | 1.0 | 7.5 | 90.0 |
| 3 | 1.5 | 10.0 | 97.7 |
| 4 | 1.0 | 10.0 | 90.8 |
| 5 | 1.5 | 12.0 | 97.5 |
| 6 | 1.5 | 13.0 | 95.8 |
| 7 | 1.0 | 12.5 | 84.8 |

EXAMPLE VII

A series of polymerizations were run similar to Example VI except that the amount of FEF carbon black was increased from 10 phm. to 20 phm. or 120 gms. Varying amounts of tricyclo (8.2.1.0$^{2,9}$) trideca - 5,11-diene dimer were employed to crosslink the polymers as they were formed. These amounts along with all other pertinent data are listed below. All polymerizations were carried out for two hours at ambient. All polymerizations produced snappy crosslinked polymers.

TABLE VII

| Experiment Number | WCl$_6$/EtOH moles×10$^4$ | EADC/O$_2$ moles×10$^4$ | Wt. percent yield | Dimer, ml. |
|---|---|---|---|---|
| 1 | 2.0 | 9.0 | High | 0 |
| 2 | 2.0 | 8.0 | High | 0 |
| 3 | 1.5 | 9.0 | High | 0 |
| 4 | 1.5 | 8.0 | High | 0 |
| 5 | 1.25 | 9.0 | High | 0 |
| 6 | 1.25 | 9.0 | 97.0 | 0.2 |
| 7 | 1.25 | 9.0 | 96.8 | 0.3 |
| 8 | 1.25 | 9.0 | 96.9 | 0.4 |
| 9 | 1.25 | 9.0 | 96.7 | 0.5 |
| 10 | 1.25 | 9.0 | 96.9 | 0.6 |
| 11 | 1.25 | 9.0 | 97.1 | 0.7 |
| 12 | 1.25 | 9.0 | 97.2 | 0.35 |
| 13 | 1.25 | 9.0 | 96.8 | 0.45 |
| 14 | 1.25 | 9.0 | 97.1 | 0.55 |

COMPARATIVE EXAMPLE

Four experiments were carried out on a premix consisting of 100 parts by weight of cyclooctene monomer, 25 parts per hunded monomer (phm.) of Shellflex 310, 1 phm. of ditertiarybutyl-p-cresol and 20 phm. of fast extruding furnace black (FEF) employing a catalyst system in which no molecular oxygen was present. The catalyst employed was a three-component catalyst system comprised of a preformed solution containing two of the three catalyst components and a second solution containing the third catalyst component. The preformed solution was a 0.05 M solution of EtOH and WCl₆ in Flexon 340 having a EtOH/WCl₆ mole ratio of 1/1 and the second solution was a 0.5 M solution of EADC in Primol 355. All polymerizations were carried out for one hour, at ambient temperatures and under a blanket of nitrogen. Pertinent data are listed in the table below:

COMPARATIVE TABLE

| Experiment Number | WCl₆/EtOH moles×10⁴ | EADC moles×10⁴ | Yield weight, percent |
|---|---|---|---|
| 1 | 1.25 | 4.0 | 0 |
| 2 | 1.25 | 7.0 | 6.9 |
| 3 | 1.25 | 8.0 | 2.8 |
| 4 | 1.25 | 9.0 | 0.3 |

As can be observed, when no molecular oxygen is employed, the yields of polymer obtained are too low to satisfy the objectives of this invention.

EXAMPLE VIII

Four experiments were carried out applying the process of the present invention to the production of cast products. All polymerizations were carried out under an atmosphere of nitrogen at ambient temperature. A preformed mixture containing 100 parts by weight of cyclooctene monomer, 25 parts per hundred monomer (phm.) of Shellflex 310, 10 phm. of FEF carbon black and 1 phm. of ditertiarybutyl-p-cresol was prepared. To each of four 200 ml. capacity reaction bottles were added 170 grams (gms.) of the above mixture. To each of these four reaction bottles was then added a sufficient amount of the crosslinking dimer tricyclo [8.2.1.0²,⁹] trideca-5,11-diene to give a volume ratio of premix to dimer of 110/1. The addition of the dimer was followed by addition of sufficient amounts of a 0.05 M preformed solution of WCl₆ and EtOH in Flexon 340 and a 0.5 M preformed solution of EADC and 0.2 in Primol 355 to effectuate polymerization. While the polymerizing premixes were still in the liquid state they were added to steel shoe sole molds. At the end of 45 minutes the finished products were removed from the molds.

The sample shoe soles which were obtained in this manner were observed to be form stable rubbery compositions having all of the configurational characteristics of the shoe sole molds in which they had been formed.

EXAMPLE IX

A series of molding experiments was carried out to further illustrate the utility of the process of the present invention in producing finished molded articles. All experiments were carried out in an atmosphere of nitrogen at ambient temperatures. A premix consisted of 100 parts by weight of cyclooctene monomer, 25 phm. of Shellflex 310, 5 phm. of fast extruding furnace black (FEF), 1 phm. of ditertiarybutyl-p-cresol. This premix was then transferred to seven 4-ounce mixing vessels, each vessel containing approximately 90 grams. To each mixing vessel was then added 1.0 gram of the crosslinking dimer tricyclo [8.2.1.0²,⁹] trideca-5,11-diene. The catalyst employed consisted of two preformed solutions, one being a 0.05 M solution of WCl₆ and N-butyl alcohol in Flexon 340 having a molar ratio of N-butyl alcohol to WCl₆ of 1/1 and the other a 0.5 M solution of O₂ and EADC in Primol 355 having a molar ratio of O₂ to EADC of 0.3/1. Sufficient quantities of these two catalyst solutions were then added to the mixing vessels containing the polymerizable premix to effectuate polymerization. While the polymerizing mixtures were still in a liquid state they were poured into the female half of a two-piece automobile horn button mold. The male half of the mold was then set in place and pressure applied to maintain the male portion of the mold in its proper position. At the end of 24 hours the two halves of the mold were separated and a product conforming to the shape of the mold removed. It was again observed that the product was a form stable rubbery composition having all of the configurational characteristics of the mold in which it was produced.

While certain representative embodiments and details have been shown for the purpose of illustrating the invention, it will be apparent to those skilled in this art that various changes and modifications may be made therein without departing from the spirit or scope of the invention.

What is claimed is:

1. A process comprising polymerizing a preformed mixture comprised of
   (I) at least one unsaturated alicyclic hydrocarbon selected from the group consisting of unsaturated alicyclic hydrocarbons containing at least 4 and not more than 5 carbon atoms in the cyclic ring and containing one carbon to carbon double bond in the cyclic ring and unsaturated alicyclic hydrocarbons containing at least 7 carbon atoms in the cyclic ring and containing one or more nonconjugated carbon to carbon double bonds in the cyclic ring,
   (II) at least one completely anhydrous compound selected from a group consisting of reinforcing agents, inert fillers and mineral pigments,
   (III) at least one highly hindered antioxidant selected from a group consisting of substituted phenols and aromatic amines,
   (IV) at least one extending oil selected from a group consisting of naphthenic, paraffinic and aromatic oils, and
   (V) at least one polyfunctional crosslinking agent selected from the group consisting of dimers composed of two or more alicyclic rings, each ring containing at least one or more nonconjugated double bonds, by subjecting said preformed mixture, under polymerization conditions, to a four component catalyst system consisting of
      (A) an organoaluminum compound,
      (B) molecular oxygen,
      (C) at least one transition metal salt selected from a group consisting of tungsten halides and tungsten oxyhalides, and
      (D) at least one compound of the general formula R—Y—H, wherein Y is selected from the group consisting of oxygen and sulfur and R is a radical selected from the group consisting of
         (1) hydrogen,
         (2) alkyl,
         (3) aryl,
         (4) arylalkyl,
         (5) alkaryl,
         (6) alkenyl,
         (7) when Y is sulfur, R is selected from the group consisting of thioalkyl, thioarylalkyl and thioalkaryl,
         (8) when Y is oxygen, R is selected from the group consisting of alkoxy, aryloxy and alkaryloxy, and
         (9) radicals of (2) through (6) wherein at least one hydrogen is substituted by a material selected from the group consisting of thiol (SH) and hydroxy (OH) groups,
and wherein the (C) catalyst component is preformed in solution in catalyst solvents having low volatilities with the (D) catalyst component in a molar ratio of $(D)/(C)$ ranging from about 0.3/1 to about 20/1 and wherein the (A) catalyst component is preformed in solution in catalyst solvents having low volatilities with the (B) catalyst component in a molar ratio of $(B)/(A)$ ranging from about 0.15/1 to about 1/1.

2. A process according to claim 1 wherein the preformed solution containing the (A) and (B) catalyst components is added to the polymerizable mixture first, followed by addition of the preformed solution containing the (C) and (D) catalyst components.

3. A process according to claim 1 wherein the molar ratio of (D)/(C) ranges from about 1/1 to about 2/1 and the molar ratio of (B)/(A) ranges from about 0.3/1 to 0.5/1 and the molar ratio of (A)/(C) ranges from about 3/1 to about 10/1.

4. A process according to claim 1 wherein the amount of reinforcing agent, inert filler or mineral pigment employed ranges from at least 15 parts per hundred monomer to 100 parts per hundred monomer.

5. A process according to claim 1 wherein the catalyst solvents having low volatilities are selected from a group consisting of aromatic and paraffinic hydrocarbon oils.

6. A process according to claim 5 wherein the catalyst solvent having a low volatility is an aromatic hydrocarbon oil having a viscosity gravity constant ranging from about 0.9 to about 1.1 and containing from about 30 to about 60 percent of the carbon atoms in aromatic rings.

7. A process according to claim 5 wherein the catalyst solvent having a low volatility is a paraffinic hydrocarbon oil having a viscosity gravity constant ranging from about 0.79 to about 0.86 and containing from about 50 to about 70 percent of the carbon atoms in paraffinic chains.

8. A process according to claim 1 wherein the unsaturated alicyclic compound is cyclooctene.

References Cited

UNITED STATES PATENTS

| | | | |
|---|---|---|---|
| 3,458,489 | 7/1969 | Natta et al. | 260—93.1 |
| 3,449,310 | 6/1969 | Dall'Asta et al. | 260—93.1 |
| 3,143,578 | 8/1964 | O'Connor et al. | 260—666 PY |
| 3,290,268 | 12/1966 | Scofield | 260—41.5 MP |
| 2,996,459 | 8/1961 | Anderson et al. | 252—429 B |
| 3,007,904 | 11/1961 | Kreuter et al. | 252—429 B |
| 3,236,824 | 2/1966 | Wilhjelm | 252—429 B |

ALLAN LIEBERMAN, Primary Examiner

U.S. Cl. X.R.

252—429 B; 260—41.5 MP, 93.1